July 12, 1966
W. E. SHOEMAKER
3,260,920
LOW DISSIPATION POWER SUPPLY
Filed Sept. 27, 1962
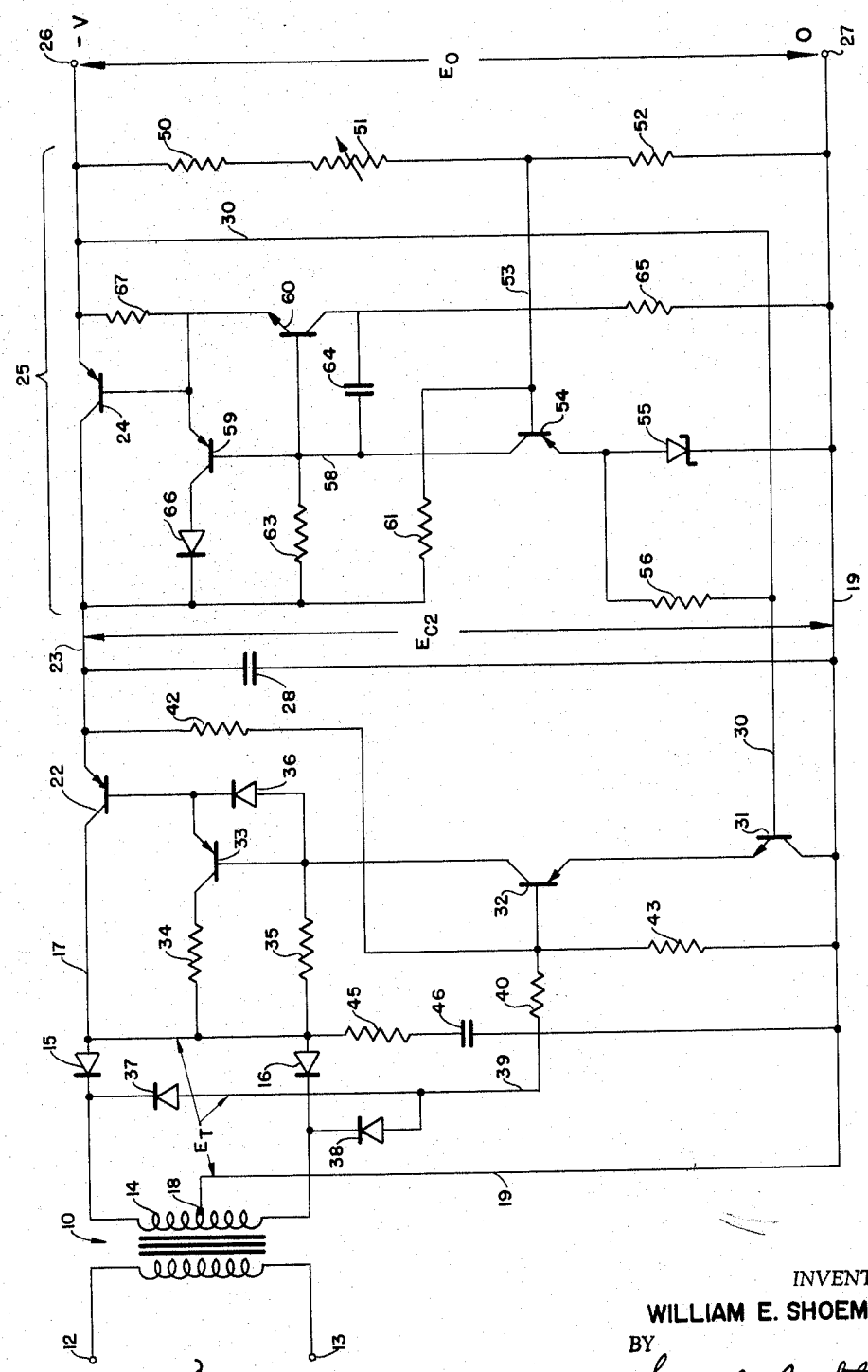
INVENTOR.
WILLIAM E. SHOEMAKER
BY
*Samuel B. Stone*
ATTORNEY United States Patent Office 3,260,920
Patented July 12, 1966

3,260,920
LOW DISSIPATION POWER SUPPLY
William E. Shoemaker, Fullerton, Calif., assignor to Beckman Instruments, Inc., a corporation of California
Filed Sept. 27, 1962, Ser. No. 226,549
5 Claims. (Cl. 321—18)

This invention relates to power supplies and more particularly to low dissipation power supplies employing solid devices.

Various circuits and arrangements have been used for supplying regulated voltage to electronic equipment. Generally, power supplies utilize an electron discharge tube or transistor connected in series with a voltage source and a load, with the tube current or transistor current being controlled in response to the output voltage. The tube or transistor is thus operated at a variable impedance in the supply lead to the load to maintain a constant voltage across the load device. With this method of regulation, an appreciable amount of power is dissipated in the regulating device thus reducing the efficiency of the apparatus and requiring means to remove the heat being generated in the regulating device. A transistor also may be operated as a switch rather than as a variable impedance for regulating an average output voltage. Transistors are nearly ideal in such an application because transistors have low leakage when open and low voltage drop when closed. Although a smaller amount of power is lost by this method, still a high-power transistor and heat sink are required and the resulting ripple is much greater than for a variable impedance regulator.

Accordingly, the present invention provides an arrangement in which the dissipation is reduced by means of a transistor switch, and a main series regulator transistor reduces ripple and provides additional regulation.

It is a further feature of the present invention to provide a power supply in which the dissipation in the main series regulator transistor is approximately the same throughout a range of line voltages.

An additional feature of the present invention is the provision of a low dissipation power supply including a pre-regulator switch which precedes the voltage regulator portion of the power supply.

A further feature of the present invention is in the provision of a low dissipation power supply including a pre-regulator switch and including means to decrease ripple and means to render the power supply short-circuit proof.

In conventional power supplies including voltage regulators of the switched transistor type, a capacitor is allowed to periodically charge (and its charge decay) to a magnitude which depends upon the magnitude of the rectified voltage applied to the capacitor and the magnitude of the load. According to the present invention, a switching circuit precedes this capacitor and limits its charge to a particular magnitude which is essentially proportional to the magnitude of the desired output voltage rather than the magnitude of the input voltage. The power supply of the present invention includes a conventional rectifier circuit connected through the switching circuit to the filter, or reservoir, capacitor and voltage regulator circuit. The voltage regulator circuit is substantially conventional with the exception of certain short-circuit proof features which will be discussed subsequently. The pre-regulator switching circuit is arranged to sense the output voltage, the rectified voltage and the voltage on the capacitor. A transistor switch is included in this switching circuit and is connected between the rectifier and the output regulator. This transistor switch conducts during a first portion of each half cycle, and subsequently is turned off when the voltage on the capacitor reaches a predetermined magnitude. If the voltage on the capacitor falls below a particular magnitude during the last half of the half cycle, this switch again turns on. This latter feature serves to reduce ripple.

In the conventional power supply and regulator wherein the capacitor is allowed to charge to a magnitude which depends on the magnitude of the rectified input voltage, a large amount of power must be dissipated by the series regulator transistor if the line voltage rises above a minimum design value. That is, the output voltage is to be maintained at a fixed value and if the input line voltage and consequently the rectified voltage increase, the capacitor voltage increases. This increase means that there is an increase in power which must be dissipated within the series regulator transistor. Hence, since the present preregulator switch limits the voltage attained by the capacitor, an increase in line voltage does not result in increased power dissipation in the series regulator transistor.

Other features and objects of the invention will be better understood from a consideration of the following detailed description when read in conjunction with the attached drawing, the single figure of which illustrates a low dissipation power supply constructed in accordance with the teachings of the present invention.

Referring now to the drawing, a transformer 10 has a primary winding 11 connected to terminals 12 and 13 of an alternating current supply (not shown). A secondary winding 14 on the transformer 10 is connected through diodes 15 and 16 to a line 17. The secondary winding includes a center tap 18 which is connected to a line 19. The line 19 may be considered a reference or ground line.

The line 17 is connected through the collector-emitter path of a transistor 22 to a line 23. The line 23 is connected to the collector of a series regulator transistor 24 in the regulator portion of the power supply generally indicated by the reference numeral 25. The emitter of the transistor 24 is connected to an output terminal 26. The reference line 19 is connected to an output terminal 27. A capacitor 28 is connected across the lines 23 and 19.

The transformer 10 and rectifiers 15 and 16 operate in a conventional manner to supply a rectified voltage on the line 17. The regulator portion 25 of the present power supply operates in a substantially conventional manner with the exception of the short circuit protection which will be discussed subsequently. Basically, the transistor 22 functions to prohibit the voltage on capacitor 28 from exceeding a predetermined level. The transistor 22 conducts during the first portion of each half cycle after the rectified voltage on the line 17 exceeds a first predetermined magnitude and turns off after this voltage reaches a second predetermined magnitude. In this way, the peak voltage, $E_{C2}$, across the capacitor 28 is maintained substantially constant irrespective of line voltage fluctuations which result in fluctuations of the voltage, $E_T$, on the line 17. The regulator portion 25 of the power supply functions to compare the output voltage across the output terminals 26 and 27 with a reference to maintain this output voltage constant.

Considering the power supply shown in the drawing in greater detail, a line 30 is connected from the output terminal 26 to the base of an NPN transistor 31. The collector of the transistor 31 is connected to the reference line 19, and the emitter of this transistor is connected to the emitter of a PNP transistor 32. The collector of the transistor 32 is connected to the base of a PNP transistor 33, the emitter of which is connected to the base of the transistor 22. Resistances 34 and 35 are connected from the line 17 to the collector and base, respectively, of the transistor 33. The transistors 22 and 33 are connected as a Darlington circuit which is well known to those skilled in the art. A diode 36 is connected between the base and the emitter of the transistor 33. Diodes 37 and 38 are connected from the secondary winding 14 of the transformer 10 to a line 39 which is connected through a resistance 40 to the base of the transistor 32. A resistance 42 is connected from the line 23 to the base of the transistor 32, and a resistance 43 is connected from the line 19 to the base of the transistor 32. The resistances 40, 42 and 43 function as a summing network to apply a particular bias to the base of the transistor 32 depending upon the voltages, $E_T$, $E_{C2}$ and $O$ (since the line 19 is at a reference potential), respectively, applied to the opposite ends of these resistances. A resistance 45 and a capacitance 46 are connected in series between the lines 17 and 19. The resistance 45 and capacitance 46 provide a path for high current inductive transients (caused by the leakage inductance of the transformer 10) when the transistor 22 turns off. Thus, these components serve to protect the transistor 22.

A potential divider including resistances 50, 51 and 52 is connected across the output terminals 26 and 27. A line 53 is connected from the junction of the resistances 51 and 52 to the base of a PNP transistor 54. The emitter of the transistor 54 is connected through a zener diode 55 to the line 19. A resistance 56 is connected between the emitter of the transistor 54 and the line 30 which is connected to the output terminal 26. The collector of the transistor 54 is connected through a line 58 to the bases of transistors 59 and 60. The base of the transistor 54 is connected through a resistance 61 to the line 23. The bases of the transistors 59 and 60 are connected through a resistance 63 to the line 23. A capacitor 64 is connected between the base and the collector of the transistor 60. The collector of the transistor 60 is connected through a resistance 65 to the line 19. The collector of the transistor 59 is connected through a diode 66 to the line 23. The emitters of the transistors 59 and 60 are connected to the base of the transistor 24. A resistance 67 is connected between the base and the emitter of the transistor 24.

The output voltage $E_O$ is applied by the line 30 to the base of the transistor 31. The emitter of the transistor 31 supplies a bias to the emitter of the transistor 32 such that the transistor 32 is open, or off, when its base is more positive than the voltage applied to its emitter (which voltage is substantially equal to the output voltage $E_O$). When the transistor 32 is off, the transistors 33 and 22 can be on. The transistor 22 turns on at the beginning of each half cycle when the voltage on the line 17 exceeds the voltage on the line 23.

If the resistance 40, diodes 37 and 38 and the line 39 were omitted, the transistor 32 would turn on (and the transistor 22 would turn off) when the voltage $E_{C2}$ across the capacitor 28 reaches a value equal to the output voltage $E_O$ divided by a constant determined by the ratio of the resistances 42 and 43. For example, the desired output voltage $E_O$ may be 18 volts and the value of the resistance 43 divided by the sum of the resistances 42 and 43 may be .72. Thus, $$E_O/.72 = 18/.72 = 25 \text{ volts}$$

and the transistor 32 would turn on when the voltage on the line 23 reached 25 volts.

The resistance 40 (in combination with the resistances 42 and 43) is included to cause the transistor 22 to come on again during the last portion of a half cycle to again allow the capacitor 28 to charge to its peak value in order to decrease ripple. The resistances 40, 42 and 43 serve as a summing network connected to the base of the transistor 32. The summing network may be illustrated in equivalent form as follows:

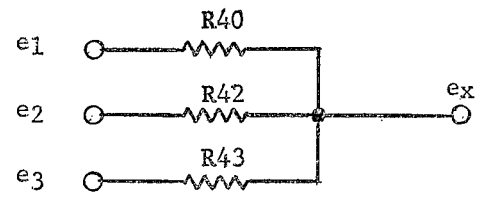

$$e_x = \frac{R_{eg}}{R_{40}}e_1 + \frac{R_{eg}}{R_{42}}e_2 + \frac{R_{eg}}{R_{43}}e_3$$

$$= \frac{R_{eg}}{R_{40}}|E_T| + \frac{R_{eg}}{R_{42}}E_{C2} + O$$

where $R_{eg}$ is the equivalent resistance of R40, R42 and R43 in parallel, $e_1$ is the voltage on the line 39 (the rectified voltage $E_T$),
$e_2$ is the voltage ($E_{C2}$) on the line 23,
$e_3$ is the voltage (zero) on the line 19, and
$e_x$ is the voltage applied to the base of the transistor 32.

As an example, the resistances 40, 42, and 43 may be 5K, 1.6K and 3K ohms, respectively. Thus, $$e_x = \frac{.86}{5}|E_T| + \frac{.86}{1.6}E_{C2} + \frac{.86}{3}O$$

$$= .17|E_T| + .55E_{C2}$$

Hence, the transistor 22 closes when the voltage on the line 17 becomes more negative than the voltage on the line 23 (the voltage $E_{C2}$ on the capacitor 28), and this transistor opens when $.17|E_T| + .55E_{C2}$ becomes greater than $E_O$ in the first portion of a half cycle. Note that when the transistor 22 is closed, the voltage on the line 17 is approximately equal (neglecting the drop in the transistor 22) to the voltage on the line 23. During the second half of a half cycle, the transistor 22 closes when a $.17|E_T| + .55E_{C2}$ becomes less than $E_O$, and this transistor again opens when $.17|E_T| + .55E_{C2}$ becomes greater than $E_O$. Rephrasing the above, the transistor 22 closes during the first portion of a half cycle and subsequently opens, closes and then opens as the voltage $$.17|E_T| + .55E_{C2}$$

varies above and below the voltage $E_O$.

As noted previously, the regulator portion 25 of the present power supply operates in a substantially conventional manner with the exception of the short circuit protection feature. The present power supply may, for example, provide a negative output voltage of 18 volts, the terminal 26 being at a voltage of −18 volts and the terminal 27 being at zero volts (complementary components may be employed to provide a positive output voltage as is well known to those skilled in the art). The resistances 50, 51 and 52 across the output terminals 26 and 27 serve as a voltage divider, and provide a voltage on the line 53 to the base of the transistor 54 which is compared with the constant voltage on the emitter of the transistor 54 provided by the zener diode 55. The resistance 51 may be varied to select the desired output voltage. If the output voltage goes down, the voltage on the base of the transistor 54 goes down and the collector current of this transistor is reduced greatly. This action causes the base of the transistor 59 to go more negative (toward the voltage of the line 23), regulating the current through the transistor 59 which in turn regulates the current through the transistor 24 to restore the output voltage to the selected value. The transistor 24 is essentially an emitter-follower, and the arrangement of the transistors 24 and 59 is similar to a Darlington circuit. The transistors 59, 60 are complementary emitter-followers, and the transistor 60 serves to regulate the leakage current of the capacitor 28 if a light load current is being drawn through the transistor 24. That is, the transistor 60 provides a load which the transistor 24 can pull against to insure that the base current of the transistor 24 will be controlled by the base current of the transistor 59 in the event of a large $I_{cbo}$ in the transistor 24. The capacitor 64 and resistance 65 serve as a "roll-off" circuit to prevent oscillation. The resistance 56 connected to the zener diode 55 supplies current to the zener diode 55.

The diode 66 is included to ensure a desired voltage drop (for example, one volt) across the transistor 24 when the line 23 is not up to the desired voltage. This prevents the transistor 22 from turning on unless $E_{C2}$ is above a predetermined value (in the order of two to three volts) at the beginning of a half cycle when the power supply is initially started or when a severe overload is present. The inclusion of the diode 66 prevents the power supply from getting started when initially turned on. However, the capacitor 46 serves a dual purpose and aids in allowing the power supply to get started (allows the charge on the capacitor 28 to build up sufficiently). Near the end of the first half cycle (after the power supply is turned on) the transistor 22 turns on and the capacitor 46 dumps its charge into the capacitor 28. This action raises the voltage on the line 23 only slightly, for example, in the order of one volt. The same operation occurs for a few cycles until the capacitor 28 acquires a sufficient charge. After the capacitor 28 acquires a sufficient charge, and thus the voltage on the line 23 is increased, the transistor 24 may conduct and normal operation begin. Hence, when the power supply is first turned on, the charge on the capacitor 28 builds up in steps which occur at the end of each half cycle when the transistor 22 turns on and allows the capacitor 46 (which has charged to the peak of the half cycle) to dump its charge into the capacitor 28. These are small voltage steps and they continue until $E_{C2}$ reaches the voltage in which the transistor 22 can turn on during a first portion of a half cycle and normal operation commence.

If a severe load (for example, 300 to 400% overload) is applied to the output terminals 26 and 27, the capacitor 28 discharges more rapidly and discharges sufficiently between charging steps (the capacitor 46 is dumping its charge into the capacitor 48 during such an overload) such that it never attains the necessary voltage to allow the transistor 22 to remain closed during a first portion of the half cycle. This is true since the voltage $E_{C2}$ falls so low that the voltage drop of the transistor 24 (including the action of the diode 66 which provides a portion of this voltage drop) and other voltage drops around the circuit are such that the transistor 22 cannot turn on, or cannot turn on for a sufficient period, to allow the capacitor 28 to acquire the necessary charge. Hence, the dissipation is very small during such an overload since the voltage $E_{C2}$ is small and no appreciable power need be dissipated by the transistor 24.

The following are exemplary values for the components of the power supply shown in the attached drawing. The input voltage may be regular line voltage, and the output voltage may be maintained at any desired voltage within an approximate range of minus 15 to minus 24 volts.

| | |
|---|---|
| Resistance 34 | 20 ohms. |
| Transistor 22 | 2N1545. |
| Transistor 24 | 2N1545. |
| Transistor 31 | 2N377A. |
| Transistor 32 | 2N404. |
| Transistor 33 | 2N2043. |
| Transistor 54 | 2N404. |
| Transistor 59 | 2N404. |
| Transistor 60 | 2N1605. |
| Diodes 15 and 16 | UT113. |
| Diodes 37 and 38 | 661. |
| Diode 55 | 6.8 v. Zener. |
| Diode 66 | Silicon. |
| Diode 36 | 661. |
| Capacitance 46 | 30 microfarads, 50 volts. |
| Capacitance 28 | 400 microfarads, 50 volts. |
| Resistance 34 | 20 ohms. |
| Resistance 35 | 1.5K. |
| Resistance 40 | 5K. |
| Resistance 42 | 1.6K. |
| Resistance 43 | 3K. |
| Resistance 45 | 5 ohms. |
| Resistance 50 | 390 ohms. |
| Resistance 51 | 2K adjustable. |
| Resistance 52 | 470 ohms. |
| Resistance 56 | 1K. |
| Resistance 61 | 24K. |
| Resistance 63 | 3K. |
| Resistance 65 | 750 ohms. |
| Resistance 67 | 100 ohms. |
| Capacitance 64 | .33 microfarad. |
| Transformer 10 | 120 v.:50 v. center-tapped. |

It now should be apparent that the present invention provides a power supply in which dissipation is reduced, particularly when line voltage is above a minimum value because of the incorporation of a novel pre-regulation switching circuit, and during overloads because of a unique short circuit protection arrangement. Additionally, ripple is reduced by allowing the pre-regulator switch to conduct more than once during a half cycle. The pre-regulator switch serves to limit the charge on the reservoir or filter capacitor to a particular magnitude which is a function of the desired output voltage rather than solely a function of the magnitude of the input voltage.

Although particular components, voltages, etc., have been discussed in connection with a specific embodiment of the circuit constructed in accordance with the teachings of the present invention, others may be utilized. Furthermore, it will be understood that although an exemplary embodiment of the present invention has been disclosed and discussed, other applications and circuit arrangements are possible and that the embodiment disclosed may be subjected to various changes, modifications and substitutions without necessarily departing from the spirit of the invention.

What is claimed is:

1. In a power supply including input terminals for receiving an alternating current, a full wave rectifier circuit means connected with said input terminals to rectify said alternating current to provide a rectified output voltage, a capacitor, a voltage regulator including a series regulator transistor, first means connecting said capacitor to said voltage regulator, second means connecting said voltage regulator to output terminals to provide a regulated output direct current voltage, the improvement comprising a first transistor switch means connected in series between said rectifier circuit means and said first means, said transistor switch means operating in an in-phase relationship with respect to the frequency of said alternating current second and third transistor switch means connected in series and connected with said first transistor switch means to control the operation of said first transistor switch means, first and second resistance means connecting said rectifier circuit means with said second transistor means to apply a control and reference voltage to said second transistor means, third resistive means connecting said capacitor to said second transistor means to apply a control voltage to said second transistor means, said first, second and third resistive means being connected together as a summing circuit, and means connecting the output of said voltage regulator to said third transistor means to apply a control voltage to said third transistor means whereby said first transistor switch means conducts during a first portion of each half cycle of said input alternating current, and subsequently is turned off by said second and third transistor means when the control voltage supplied by said third resistive means reaches a predetermined magnitude, and whereby said first transistor switch means again turns on during the last half of the half cycle of said input alternating current if the control voltage supplied by said third resistive means falls below a predetermined magnitude.

2. A power supply as in claim 1 wherein said voltage regulator includes control means and a series connected diode and transistor coupled with said series regulator transistor to provide a predetermined fixed voltage drop across said series regulator transistor when the voltage on said capacitor is below a particular value, said series connected diode and transistor operating in conjunction with said resistive means and said second transistor switch means to aid in preventing said capacitor from being charged when severe loads are applied to the power supply.

3. In a low dissipation power supply including input terminals for receiving an input voltage, rectifier means connected with said input terminals for rectifying said input voltage, a capacitor, a voltage regulator, output terminals, the voltage regulator being connected with said capacitor and said output terminals, the improvement comprising switching means for controlling the voltage applied to said capacitor, said switching means operating in an in-phase relationship with respect to the frequency of the input voltage, first means connecting said rectifier means to said switching means, second means connecting said switching means to said capacitor and said voltage regulator, said switching means including a first semiconductive device connected in series between said rectifier means and said voltage regulator, control means including a summing circuit connected to a second semiconductive device for supplying electrical control signals to said switching means, said summing circuit including a plurality of resistances, a plurality of which are connected with said rectifier means and another of which is connected with said capacitor, said control means also being connected with said voltage regulator whereby said control means responds to the output of the voltage regulator, the output of said rectifier means and the voltage on said capacitor to control the operation of said first semiconductive device to switch twice during each half cycle of the frequency of the input voltage during normal operation of said power supply.

4. A low dissipation power supply as in claim 3 wherein each of said semiconductive devices comprises a transistor, said switching means further includes a fourth transistor connected with the first and second transistors, said voltage regulator includes a series regulator transistor and a series connected diode and semiconductive device connected across a junction of said series regulator transistor to maintain the voltage drop across said series regulator transistor at a predetermined level when the voltage of said capacitor is below a particular level, whereby the operation of said first semiconductive device is affected to thereby prevent said capacitor from becoming fully charged when severe loads are applied to said power supply.

5. In a low dissipation power supply including input terminals for receiving an alternating current, a transformer having a primary winding connected to said input terminals and a center tapped secondary winding, a full wave rectifier connected with said secondary winding to rectify said alternating current to provide a rectified output voltage, a first capacitance, a voltage regulator including a series regulator transistor, first means connecting said first capacitance to said voltage regulator, second means connecting said voltage regulator to output terminals to provide a regulated output direct current voltage, the center tap of said secondary winding serving as a common voltage conductor and being connected to one of said output terminals, a potential divider connected across said output terminals and having an intermediate terminal, the improvement comprising a first semiconductor device connected in series between said rectifier and said first means whereby said first semiconductor device, said first means and said series regulator transistor are connected in series between said rectifier and one of said output terminals, and said first capacitance is connected between the junction of said first semiconductor device and said first means and the common voltage conductor, said first semiconductor device operating in an in-phase relationship with respect to the frequency of said alternating current, second and third semiconductor devices connected in series, a fourth semiconductor device coupled with said first semiconductor device and coupled with, and under the control of, said second and third semiconductor devices, a first resistance connected between said rectifier and said second semiconductive device to apply a control voltage thereto, a second resistance connected between said common voltage conductor and said second semiconductive device to apply a control voltage thereto, a third resistance connected from the junction of said first semiconductive device and first means to said second semiconductive device to apply a control voltage thereto, a fourth resistance and a second capacitance connected in series between said rectifier and said common voltage conductor, fifth and sixth semiconductor devices connected in series across a junction of said series regulator transistor, a control circuit connected with said common voltage conductor, said potential divider intermediate terminal and said sixth semiconductor device to control the operation of said series regulator transistor, said fifth semiconductor device operating in conjunction with said series regulator transistor and said sixth semiconductor device to maintain the output voltage of the power supply at a predetermined fixed level below the voltage of said first capacitance when the voltage of said first capacitance is below a predetermined level to prevent said first semiconductor device from turning on or remaining on for a sufficient period of time to keep said first capacitance from becoming fully charged when severe loads are applied to said power supply.

References Cited by the Examiner

UNITED STATES PATENTS 3,040,183   6/1962   Farnsworth _____ 323—22 X

OTHER REFERENCES

J. S. Riordon: "Power Supply Uses Switching Preregulation," Electronics, Mar. 9, 1962, (pp. 62–64 are relied on).

JOHN F. COUCH, *Primary Examiner.*

LLOYD McCOLLUM, *Examiner.*

K. HADLAND, K. D. MOORE, *Assistant Examiners.*